Patented Feb. 26, 1952

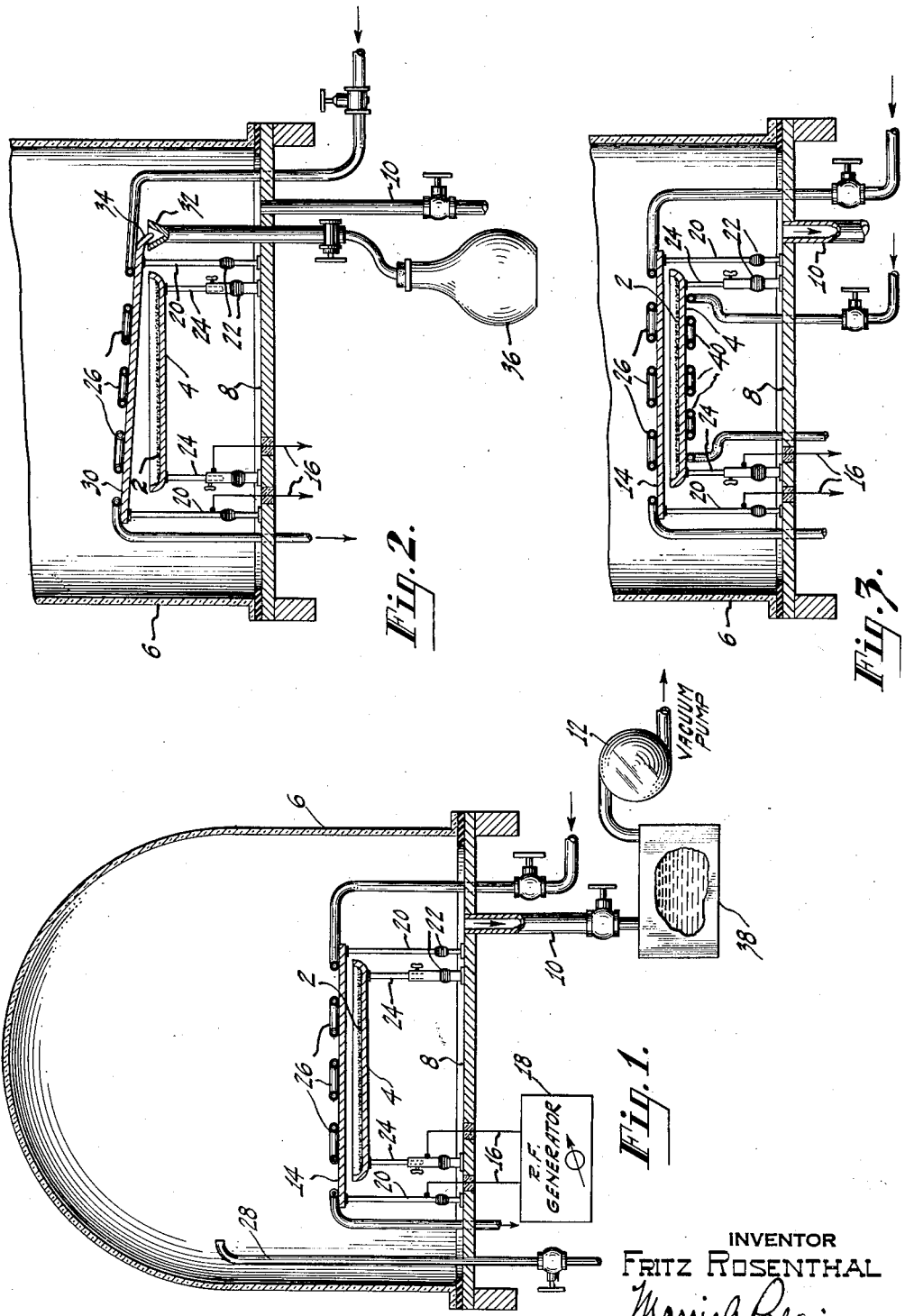

2,586,996

UNITED STATES PATENT OFFICE 2,586,996

PREPARATION OF POLYMERIZABLE NON-POLAR SUBSTANCES

Fritz Rosenthal, Knoxville, Tenn., assignor to Radio Corporation of America, a corporation of Delaware Application October 30, 1947, Serial No. 783,138

7 Claims. (Cl. 260—669)

This invention relates to improvements in preparing certain types of chemical products and, more particularly, to the use of radio frequency heating in preparing, from polar materials, substances which are substantially non-polar and which are also highly susceptible to heat. These non-polar products may be of a type which is susceptible to polymerization when heated or susceptible to other chemical or physical changes which it may be desired to inhibit.

It is well known, for example, that certain olefins, such as styrene (vinyl benzene), have a great tendency to polymerize rapidly in the presence of heat. This tendency is utilized to advantage in the preparation of the familiar polystyrene synthetic resins. However, for some purposes, it is desired to obtain styrene or substituted styrene compounds in as pure a monomeric form as possible and various expedients, such as the use of inhibitors, must be resorted to in order to get reasonably high yields.

The present invention has for its principal object the provision of a novel process whereby non-polar substances susceptible to heat may be more readily prepared from substances which are polar in nature.

Another object is to provide an improved method for the preparation, in general, of non-polar monomeric substances readily polymerizable under the influence of heat, from materials which are polar in nature.

Another object is to provide an improved method of obtaining high yields of monomeric olefins in pure form.

Another object is to provide an improved method for the preparation of styrene or substituted styrene compounds by the pyrolitic decomposition of certain polar materials.

Still another object is to provide improved apparatus for the preparation of non-polar materials highly susceptible to heat, from polar materials, using radio frequency energy as a heat source.

Other objects will be more readily apparent and the invention will be better understood from a study of the following specification, including the drawings, in which:

Figure 1 is a diagrammatic cross section view of one embodiment of apparatus suitable for carrying out the improved process of the present invention, Fig. 2 is another embodiment of the apparatus shown in Fig. 1, and Fig. 3 is still another embodiment of the apparatus of Fig. 1.

One form of the invention will now be illustrated with respect to the preparation of styrene although it will be readily apparent to those skilled in this art that the same principle of preparation could be applied to the production of a wide variety of materials.

It has been well known to prepare styrene from several different starting materials which have a highly polar nature. Among these is phenylmethyl carbinol. The common method of preparation has been to strongly heat a quantity of the carbinol, preferably in the presence of a decomposition or dehydration catalyst and a polymerization inhibitor, such as hydroquinone, and rapidly condense, from the vapor form, the styrene which is produced by the removal of water from the phenylmethyl carbinol molecule. $\beta$-phenylethyl alcohol can also be used as the starting material in a similar reaction. However, it is very difficult to remove the styrene rapidly enough from the heated reaction zone so that some polymerization of the monomer does not occur. Hence, when the monomeric form is desired, this method is far from satisfactory.

Accordingly, in the present invention, a method of preparation is provided which is simple to carry out, yet largely inhibits polymerization.

A quantity of the raw materials 2, such as a mixture of phenyl methyl carbinol, a dehydration catalyst, such as activated alumina ($Al_2O_3$) or zinc chloride, and an inhibitor, such as hydroquinone, is placed on a reaction tray 4 within an evacuable reaction chamber 6, having a floor plate 8, from which chamber the air may be continuously pumped through a line 10 by means of a suitable exhaust pump 12. A considerable quantity of the aluminum oxide, say twice the weight of alcohol present, may be used in order to absorb the water produced in the reaction and the inhibitor may be present in an amount equal to 1–5 percent of the carbinol, although these amounts are merely illustrative and are by no means critical.

The reaction tray 4 serves as one electrode of a radio frequency field generator, of which a plate 14, spaced approximately parallel to and but a short distance, as 1 or 2 inches, above the top edge of the reaction tray, serves both as a second electrode and as a collecting plate. Both electrodes, which may be made of aluminum or copper or of steel plated with a more resistant metal, are connected through leads 16 to a radio frequency oscillator 18 of a conventional type. The top electrode 14 is provided with suitable supporting legs 20 having insulators 22. The lower electrode 4 is also provided with supporting legs 24 and insulators 22, the legs being of adjustable height in order to vary the spacing between electrodes as desired.

When the radio frequency power is applied to the electrodes, the alcohol, being a polarized dielectric, readily absorbs sufficient energy to become rapidly heated to a temperature to which it decomposes to produce styrene vapor and water. The water vapor is absorbed by the dehydration catalyst.

The upper electrode 14 is cooled by a cooling medium maintained at a low temperature and circulated through pipe coils 26 positioned adjacent its upper surface, which maintains this electrode at a temperature well below the boiling point of styrene (144° C.). The cooling medium may be cold water or a more efficient heat absorber such as cold ethylene glycol. A heat exchanger for absorbing the heat picked up by the cooling medium and a pump for circulating the cooling medium in the pipes 26 are also preferably provided for efficient operation. Since styrene is substantially non-polar, it does not absorb the radio frequency energy present in the field between the electrodes to any great extent and, hence, is not unduly heated thereby. The temperature of the collecting surface is preferably also kept sufficiently low to prevent the heat being radiated by the reaction mixture and the lower electrode from raising the temperature of the condensate to a point where polymerization is likely to begin.

Since oxygen is a catalyst for the polymerization of styrene, it is also preferable to provide some neutral atmosphere within the chamber 6. This may be done by providing a gas inlet 28 connected to any suitable source (not shown) of a gas, such as nitrogen. The vacuum pump, if kept running, will, of course, continuously remove part of this gas so that it must then be continuously supplied to the chamber.

The styrene liquid adhering to the top collecting electrode 14 may either be removed intermittently or by utilizing a tilted electrode 30 draining into a collecting funnel pipe 32 from a drain spout 34 and finally into a collecting flask 36 as shown in Fig. 2.

Although phenyl alcohols have been listed above as a suitable raw material source of the styrene, various other materials may also be used, if desired. For example, the corresponding bromides or chlorides may be used, in which case a dehydrating agent is not necessary. It is desirable, however, to then provide means for absorbing the halogen acid which is produced as the other principal reaction product and which will largely remain in the vapor state. As shown in Fig. 1, this may be accomplished by providing an absorption chamber 38 in the suction line 10, ahead of the vacuum pump. This chamber may be partially filled with a strong alkali, such as sodium or potassium hydroxide.

It will be understood that the method of the present invention, as applied to the preparation of styrene, is not limited to use of any one of the several polar compounds commonly used for preparing the olefin. Styrene may also be prepared in a similar manner by the removal of carbon dioxide from cinnamic acid. This may be accomplished by heating the cinnamic acid to about 200° C. Chloro ethyl benzene may also be used as a starting material for the preparation. The essential feature of the process is that a source material be used which is highly polar and, therefore, readily capable of absorbing radio frequency energy.

Although the process has been illustrated by a description of the preparation of styrene, it will be recognized that it lends itself to a wide variety of chemical preparations, the chemistry of which is known. Further examples are any of the volatilizable liquid or solid olefins which can be prepared by dehydration of their corresponding alcohols or removal of hydrogen halide from the corresponding halogenated alcohol. More generally, there can be prepared any volatile non-polar compound which can be obtained by heating and decomposing a less volatile polar compound but the process has especial utility over previous processes when used for preparing those heat-sensitive materials which can be prepared by fractional distillation methods and which would be undesirably affected by the heat present in distillation chambers of the usual types. In cases where the product is not susceptible to further decomposition or polymerization when heated, previous processes are often entirely satisfactory and the present method would not need to be resorted to in order to obtain high yields. Where the product is heat unstable, the present invention provides a method in which the volatilized reaction product may be condensed immediately within the zone of influence of the heat source instead of requiring, as in previous processes, that the product be removed from the heating zone with consequent time delay and possible modification of the product.

Another specific example of a chemical reaction in which the present method is especially useful is the preparation of a substituted styrene compound such as 2,5,2'-5' - tetrachloro - 4,4'-divinyl - biphenyl from 2,5,2',5' - tetrachloro-4,4'-di-($\beta$-hydroxyethyl)-biphenyl using a dehydration catalyst such as activated alumina. About 1 part of the carbinol is mixed with about 0.01 part of hydroquinone as a polymerization inhibitor and the mixture is heated to 600°–800° C. in the presence of about 2 parts of the alumina. In a more conventional type method of preparation using a silica combustion tube, which method is described in my co-pending application, Serial No. 632,083, filed November 30, 1945, now U. S. Patent 2,496,067, issued January 31, 1950, despite the use of technique including immediately chilling the reaction products adjacent the reaction chamber, some decomposition occurs, as evidenced by formation of hydrogen chloride, due to the influence of the large amount of heat and high temperatures required to carry out the reaction. However, when the same ingredients are placed in a reaction tray as illustrated in Figs. 1–3 of the present application and subjected to a radio-frequency field, the product can be cooled sufficiently rapidly and kept cool so that almost no decomposition occurs. The yield is also much higher. The reaction is preferably carried out under conditions of high vacuum, as 5–10 mm. of mercury, and a nitrogen atmosphere may be provided.

In a similar manner, it is also advantageous to prepare 4,4'-divinyl-biphenyl from 4,4'-di-($\beta$-hydroxyethyl)-biphenyl by the method of the present invention. As an example, 12 parts of the di-($\beta$-hydroxyethyl)-biphenyl may be mixed with 0.12 part of hydroquinone and heated to about 230° C. in the presence of 21 parts of activated alumina. The entire mixture is placed in the reaction tray and the radio-frequency field is applied. A high vacuum of 5–10 mm. of mercury is preferably utilized in the reaction chamber. The 4,4'-divinyl-biphenyl distills off in vapor form and is collected as a solid on the bottom of the chilled upper electrode.

Where the end product formed is a solid, the lower surface of collecting electrode 14 may be scraped from time to time to collect the product. It is also possible to employ a continuous rotary scraper and collecting trough.

Although the apparatus of Fig. 1 has been shown as including an exhaust line and source of neutral gas, it will be recognized that not all types of reactions require these provisions. Where the product is not adversely affected by ordinary atmospheric conditions, the reaction chamber may have an atmosphere of ordinary air.

As indicated in the above examples, it has been found that any of the substituted styrene compounds which are non-polar but which may be prepared by decomposing materials which are, themselves, polar, may be prepared by the processes of the present invention. Moreover, it is intended that the above given examples shall only be illustrative of the general method, the scope of which includes the use of reacting materials which are polar in nature and the formation of products which are non-polar in nature. The reaction which produces the end product need not always be a simple decomposition type but may be one which involves the interaction of two or more substances, at least one of which is polar. It is desirable, however, that the secondary products which are formed do not interfere with the primary product to any great extent.

The heat present in the vicinity of the collecting electrode may be further reduced and the efficiency of the process correspondingly increased by cooling the bottom electrode plate 4 which contains the material being heated. Although this results in more radio-frequency energy being needed to raise the temperature of the reacting material, the insulation value of the material, itself, permits the surface material to become hot although that part of the material in direct contact with the plate 4 may be cold. This greatly cuts down the heat radiated from the lower to the upper electrode and introduces a distinct advantage not possible to obtain by utilizing other sources of heat energy such as direct heating by means of a gas flame or an electric resistance element. This modification of the invention is illustrated in Fig. 3 wherein the bottom electrode plate 4 is cooled by circulating cooling fluid through the pipe coils 40.

The optimum frequency of the radio-frequency energy to be applied in any given instance, as well as the power input, depends upon several variables. Different materials are able to accept different amounts of power and this varies a great deal from substance to substance. The area of the electrodes, degree of vacuum, spacing between electrodes, etc., are other factors which affect the maximum voltage and power requirements. Frequencies of about 10 to about 1,000 megacycles may be used in the process. For many preparations, a frequency of 30 megacycles has been found to be efficient. A radio frequency oscillator having a power output of up to 2 kw. is sufficiently large for most small scale operations using electrodes small enough to fit within vacuum jars of 20 inch diameter or less.

There has thus been described a novel method of preparing chemical compounds which are sensitive, that is, labile, to heat, where the products are non-polar in nature and at least one of the reactants is polar. Although capable of rather broad application, it is most applicable to the preparation of certain volatile organic materials which are very difficult to prepare from less volatile materials by ordinary distillation methods because the heat required to effect their separation also tends to change them into other substances either through polymerization or other molecular modification. Particular apparatus suitable for use in this method has also been described although the forms illustrated are only typical of a large number of modifications which could be utilized.

I claim as my invention:

1. A method of preparing a volatile non-polar product, which is unstable in the presence of heat, from materials at least one constituent of which is polar in nature which comprises heating the reaction mixture by means of radio-frequency energy, whereby only said polar constituent is heated to an appreciable extent, to a temperature at which said non-polar product is formed and which is above the volatilizing temperature of said product, volatilizing said non-polar reaction product and rapidly condensing said product at a reduced temperature before substantially any molecular modification of the type comprising polymerization can occur in said product.

2. A method, according to claim 1, in which said non-polar compound is an olefin.

3. A method, according to claim 1, in which said non-polar compound is of the class consisting of styrene and non-polar substituted styrene compounds.

4. A method, according to claim 1, in which said non-polar compound is styrene and said polar material is from the class consisting of phenyl methyl carbinol, β-phenyl ethyl alcohol, chloro ethyl benzene and cinnamic acid.

5. A method, according to claim 1, in which said non-polar compound is 4,4'-divinyl-biphenyl and said polar material comprises 4,4'-di-(β-hydroxyethyl)-biphenyl.

6. A method, according to claim 1, in which said preparation takes place in a reduced pressure atmosphere.

7. A method, according to claim 1, in which said preparation takes place in a neutral atmosphere under reduced pressure.

FRITZ ROSENTHAL.

REFERENCES CITED

The following references are of record in the file of this patent:

UNITED STATES PATENTS

| Number | Name | Date |
|---|---|---|
| 1,400,959 | Koetschet | Dec. 20, 1921 |
| 1,813,514 | Schmidt et al. | July 7, 1931 |
| 1,895,489 | Ruben | Jan. 31, 1933 |
| 1,909,357 | Jaeger | May 16, 1933 |
| 1,986,348 | Lacy et al. | Jan. 1, 1935 |
| 2,037,712 | Frankforter et al. | Apr. 21, 1936 |
| 2,071,551 | Matheson | Feb. 23, 1937 |
| 2,079,750 | Sweeney et al. | May 11, 1937 |
| 2,087,480 | Pitman | July 20, 1937 |
| 2,325,652 | Bierwirth | Aug. 3, 1943 |
| 2,399,395 | Shriver | Apr. 30, 1946 |
| 2,455,812 | Schlesman | Dec. 7, 1948 |
| 2,459,225 | Hickok | Jan. 18, 1949 |
| 2,465,486 | Rosenthal | Mar. 29, 1949 |
| 2,476,283 | Castellan | July 19, 1949 |
| 2,486,684 | Schlesman et al. | Nov. 1, 1949 |
| 2,509,439 | Langer | May 30, 1950 |
| 2,513,991 | Bradbury | July 4, 1950 |

FOREIGN PATENTS

| Number | Country | Date |
|---|---|---|
| 338,262 | Great Britain | Nov. 20, 1930 |

OTHER REFERENCES

Robertson: Industrial and Engineering Chem., May 1944, pages 440–447.

"Vinyl Aromatic Compounds," by David T. Mowry et al., J. Amer. Chem. Soc., June, 1946, pages 1105–1109.